Patented May 5, 1936

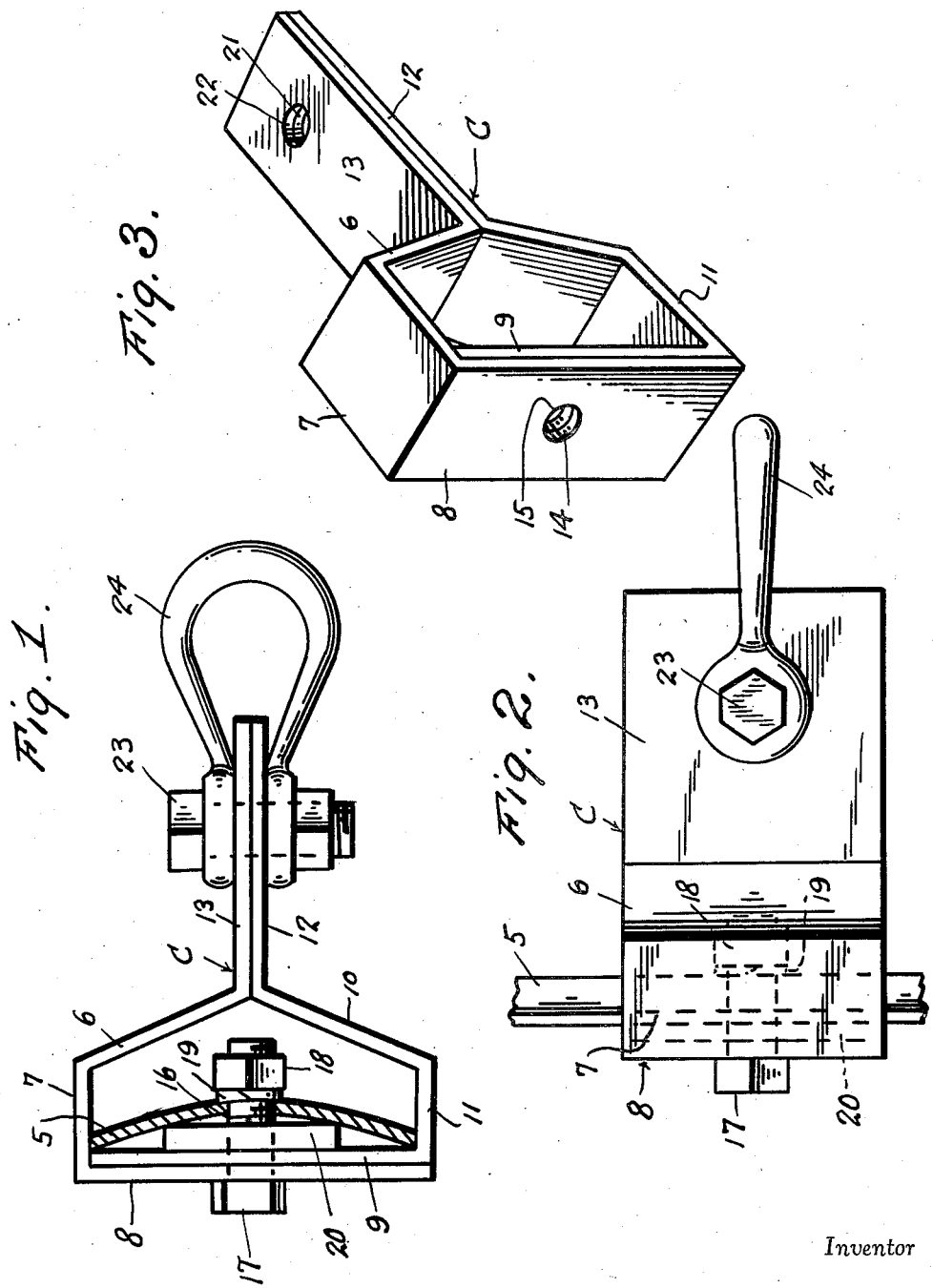

2,039,689

UNITED STATES PATENT OFFICE 2,039,689

TRAILER HITCH COUPLING

Leroy A. Tade, Claremont, Calif.

Application December 21, 1934, Serial No. 758,665

1 Claim. (Cl. 280—33.15)

This invention relates to trailer hitch couplings.

One of the objects of the invention is the provision of a sectional clamp which is used for attaching a trailer hitch to the rear bumper of any passenger automobile or truck for the purpose of towing or pulling any trailer and can be used as a coupling for the trailer regardless of whether the trailer is equipped with a ball hitch, a clevis hitch or a bolt hitch or any other form of hitch in common use.

Further objects of the invention are to provide a coupling of the character referred to that is strong, compact and durable, thoroughly reliable for its intended purpose, very simple to install and remove from an automobile having a bumper, and that is comparatively inexpensive to manufacture.

With the foregoing and other objects in view the invention consists of a novel construction, combination and arrangement of parts as will be hereinafter more specifically described and illustrated in the accompanying specification and drawing wherein is disclosed an embodiment of the invention, but it is to be understood that changes, variations and modifications may be resorted to without departing from the spirit of the claim hereunto appended.

In the drawing wherein like reference characters denote corresponding parts throughout the several views:—

Figure 1 is a sectional view through a bumper of an automobile showing an adaptation therewith of the coupling in accordance with the present invention and which view is turned 90 degrees from the position in which the device is assembled.

Figure 2 is a top plan view of an automobile bumper showing an adaptation therewith of the present invention.

Figure 3 is a perspective view of the coupling without the bolts and also removed from the automobile bumper.

Referring to the drawing in detail, 5 indicates an automobile bumper, which for the purpose of illustration is a single bar bumper which in the conventional type is arcuate in a perpendicular direction. While I have shown the clamp attached to the single bar type, it will be understood that the same may be used with bumpers of various types.

The clamp of the present invention is indicated at C and is formed in two sections. Each section is formed with a substantially U-shaped body portion from a relatively flat steel bar. The upper U-shaped body portion is formed with opposite legs 8 and 6 and a crown portion 7. The opposite section is likewise formed with legs 9 and 10 and a crown portion 11. The body portions of the respective clamp sections are formed integral. Extending rearwardly from the leg 10 is a flat extension 12 which abuts a like extension 13 projecting rearwardly from leg 6. Extensions 12 and 13 abut each other when the clamp is secured to the bumper.

The clamp sections have the legs 8 and 9 the same width and in abutment with each other. These abutting legs, 8, 9 are formed with the respective openings 14, 15 which register with each other.

To attach the sectional clamp to the bumper 5 a hole 16 is drilled through the bumper 5 and a bolt 17 is inserted through the registering openings 14 and 15. On the inner end of bolt 17 is screwed the nut 18 which bears against a washer 19, which washer bears on the bumper about the opening 16. It will thus be seen that the section of the clamp may be assembled on the bumper in a very easy manner since the legs 8 and 9, of the section embrace the bumper. The U-shaped body portions of the clamp when assembled as shown in Figures 1 and 2 of the drawing entirely surround the bumper. In cases where it is desired to add strength to the bumper 5, I may use an apertured plate 29 between the leg 9 and the inner face of bumper 5 so that when nut 18 is screwed tightly on the bolt the plate will form a reinforcement for the bumper bar.

The flat extension 12 is formed with an opening 21 while its companion extension 13 is likewise formed with an opening 22 registering therewith. The clamp of the present invention is adapted for hitching trailers equipped with a ball hitch, clevis hitch, or bolt hitch, and in the form illustrated in the drawing, I have shown a bolt 23 extending through the registering openings to which is secured the ears on the clevis 24.

In assembling the sectional coupling of the present invention on the automobile bumper 5, a hole 16 is drilled in the center of the bumper bar. Then the lower section of the clamp is placed around the bumper with the leg 9 behind the bumper. Then the upper section is placed over the top of the bumper with leg 8 behind the bumper and in abutment with the leg 9. When the openings in the legs 8 and 9 are in registry, a bolt is inserted through the opening in the bumper bar and the openings in the legs. If desired, the reinforcing plate 20 may be inserted as shown in Figure 1. If any other kind of trailer attachment beside the clevis is used that does not permit the use of the bolt 23, then the bolt 23 can be removed and the other hitch attachments can be inserted in the registering openings 21, 22.

Having thus described my invention, what I claim as new is:

A coupling clamp of the character described comprising a pair of elongated plate members, said plate members being provided with portions lying flatly against each other, said plate members being provided with diverged portions extending from the aforementioned portions and provided with parallel extending portions, and interlapping leg members extending inwardly from the said parallel portions, means for connecting the interlapping leg members to a drawing vehicle and means for attaching the flatly engaging portion to a draft structure.

LEROY A. TADE.